(12) United States Patent
Atsushi et al.

(10) Patent No.: US 7,746,425 B2
(45) Date of Patent: Jun. 29, 2010

(54) POLARIZING OPTICAL DEVICE, LIQUID CRYSTAL DISPLAY USING THE SAME AND METHOD OF MAKING THE SAME

(75) Inventors: Sato Atsushi, Kanagawa (JP); Nagata Yoshihide, Kanagawa (JP); Ji Woo Kim, Yongin-si (KR)

(73) Assignee: Cheil Industries, Inc., Gumi-si, Gyeongsanbguk-do (KR)

( * ) Notice: Subject to any disclaimer, the term of this patent is extended or adjusted under 35 U.S.C. 154(b) by 478 days.

(21) Appl. No.: 11/649,790

(22) Filed: Jan. 5, 2007

(65) Prior Publication Data
US 2007/0159577 A1 Jul. 12, 2007

(30) Foreign Application Priority Data
Jan. 6, 2006 (JP) ............................ 2006-27668

(51) Int. Cl.
*G02F 1/1335* (2006.01)
(52) U.S. Cl. ...................................................... 349/96
(58) Field of Classification Search ................... 349/62, 349/96–98; 359/483–489
See application file for complete search history.

(56) References Cited

U.S. PATENT DOCUMENTS 6,665,119 B1 * 12/2003 Kurtz et al. ................. 359/486
6,813,077 B2 * 11/2004 Borrelli et al. .............. 359/486
7,106,507 B2   9/2006 Lee et al.
2004/0008416 A1   1/2004 Okuno
2004/0264350 A1  12/2004 Ueki et al.
2005/0046943 A1 *  3/2005 Suganuma .................. 359/497
2005/0105018 A1   5/2005 Miyata

FOREIGN PATENT DOCUMENTS

| JP | 09-090122 | 4/1997 |
| JP | 2004-045672 | 2/2004 |
| JP | 2005-037900 | 2/2005 |
| JP | 2005-070456 | 3/2005 |
| KR | 10-2005-0046573 | 5/2005 |
| KR | 10-2005-0105383 | 11/2005 |

* cited by examiner

Primary Examiner—Dung T. Nguyen
(74) Attorney, Agent, or Firm—Lee & Morse, P.C.

(57) ABSTRACT

A polarizing optical device has first and second major surfaces. The polarizing optical device is provided at the first major surface thereof with extrafine structures made of a metal and arranged in a specific direction. The extrafine metal structures are provided at surfaces thereof with a metal compound part, the metal compound part being formed by performing surface treatment on the surfaces of the extrafine metal structures. When light is incident from the first major surface side, light polarized in a direction parallel to the specific direction is absorbed, and light polarized in a direction perpendicular to the specific direction is transmitted. When light is incident from the second major surface side, light polarized in the direction parallel to the specific direction is reflected, and light polarized in the direction perpendicular to the specific direction is transmitted.

27 Claims, 5 Drawing Sheets

(A)

(B)

(A)

(B)

(A)

(B)

POLARIZING OPTICAL DEVICE, LIQUID CRYSTAL DISPLAY USING THE SAME AND METHOD OF MAKING THE SAME

BACKGROUND OF THE INVENTION

1. Field of the Invention

The present invention relates to a polarizing optical device and a liquid crystal display (LCD) using the same.

2. Description of Related Art

A LCD is an apparatus that changes light emitted from a backlight unit (BLU) into linearly polarized light using a polarizer, rotates the linearly polarized light according to the application of voltage to a liquid crystal (LC) layer, and selectively transmits the polarized light using an analyzer, thereby modulating the polarized light and realizing black and white display. At the present time, color display may also be accomplished using a color filter.

A typical polarizer is a dichroic polarizer manufactured by dyeing oriented poly vinyl alcohol (PVA) film with a compound (urea or dichroic dye) having light absorption anisotropy. The polarizer absorbs a polarized light component parallel with an absorption axis of the dichroic dye and transmits a polarized light component perpendicular to the absorption axis of the dichroic dye. Only light transmitted through the polarizer is used as the linearly polarized light. The dichroic polarizer is an absorption type polarizer, having a natural light transmittance of about 50% or less. Consequently, the optical efficiency of the dichroic polarizer is very low.

In order to prevent loss due to the optical absorption of the dichroic polarizer, a reflection type polarizer may be employed, which is capable of reflecting linearly polarized light having a specific direction and transmitting another polarized light having a different direction.

As an example of a reflection type polarizer, there has been proposed a polarizer having an extrafine metal grid (wire grid) structure. Specifically, the reflection type polarizer may be constructed of metal wires having a diameter much less than the wavelength of light to be displayed. The metal wires may be arranged parallel to one another. Consequently, the reflection type polarizer may have polarization characteristics in which the reflection type polarizer reflects a polarized light component parallel to the metal wires, i.e., a transverse electric (TE) polarized light, and transmits a polarized light component perpendicular to the metal wires, i.e., a transverse magnetic (TM) polarized light.

When the reflection type polarizer is used in a LCD, only the TM polarized light component in the non-polarized light emitted from the BLU may be transmitted through the reflection type polarizer to be incident on a LC layer. Thus, the TM polarized light may be used for display.

On the other hand, the TE polarized light may be reflected by the reflection type polarizer, thus returning to the BLU. The TE polarized light may be reflected diffusely inside the BLU. As a result of the diffuse reflection, the TE polarized light may be changed into non-polarized light. This non-polarized light may be incident again on the reflection type polarizer, which is repeatedly performed. Consequently, most of the light emitted from the BLU may be changed into TM polarized light, which is incident on the LC layer, thereby considerably improving optical efficiency of the LCD versus using a dichroic polarizer.

When a dark display operation is performed on the LCD, however, a TE polarized light component in ambient light incident on the LCD may be reflected by the reflection type polarizer. As a result, the display contrast may be decreased.

To minimize reflection of ambient light, an extrafine metal grid (wire grid) structure may be combined with an optical absorption type extrafine grid structure. However, such a combination may require a large number of materials and complicated processes. Thus, such a combination may not be practically manufactured with a size suitable for a large LCD, e.g., an LCD having a diagonal size of 20 inches or more.

SUMMARY OF THE INVENTION

The present invention is therefore directed to a polarizing optical device, an LCD using the same and a method of making the same, which overcome one or more of the disadvantages of the related art.

It is a feature of an embodiment of the present invention to provide a polarizing optical device that, when applied to a LCD, may provide a high contrast display.

It is another feature of an embodiment of the present invention to provide a polarizing optical device that may be readily manufactured even with a large size.

It is yet another feature of an embodiment of the present invention to provide a polarizing optical device having a high optical efficiency.

At least one of the above and other features and advantages of the present invention may be realized by providing a polarizing optical device having first and second major surfaces, including extrafine structures made of a metal and arranged in a specific direction at the first major surface, and a metal compound part formed on surfaces of the extrafine metal structures, wherein when light is incident from the first major surface side, light polarized in a direction parallel to the specific direction is absorbed, and light polarized in a direction perpendicular to the specific direction is transmitted, and when light is incident from the second major surface side, light polarized in the direction parallel to the specific direction is reflected, and light polarized in the direction perpendicular to the specific direction is transmitted.

The extrafine metal structures may each have a length in the specific direction that is longer than a maximum design wavelength and a length in the direction perpendicular to the specific direction that is less than a minimum design wavelength. The extrafine metal structure may include a plurality of unit constituents arranged in the specific direction. The plurality of unit constituents may be dispersed or may be arranged in a regular pattern. The plurality of unit constituents may each extend substantially along the specific direction on the first major surface.

The polarizing optical device may include a transparent layer covering the extrafine metal structure. An upper surface of the transparent layer may be approximately flat. The transparent layer may be an adhesive transparent resin. The transparent layer has a thickness sufficient not to cause thin film interference.

The metal may be aluminum and the metal compound may be anodic oxide film. The metal compound part includes a colorant. The colorant may include at least one of a dye, a pigment, dissimilar small metal particles and metal compounds particles. The extrafine metal structure may include a tube coated with a metal, the metal compound part being formed on an upper surface of the tube.

At least one of the above and other features and advantages of the present invention may be realized by providing a liquid crystal display including an liquid crystal panel having a liquid crystal layer disposed between a first substrate and a second substrate, and a backlight unit for illuminating the liquid crystal layer from the second substrate side, the liquid crystal display including a polarizing optical device between the first substrate and the backlight unit, the polarizing optical device including extrafine structures made of a metal and arranged in a specific direction at the first major surface, and a metal compound part formed on surfaces of the extrafine metal structure, the first major surface of the polarizing optical device facing the liquid crystal layer, when light is incident from the first major surface side, light polarized in a direction parallel to the specific direction is absorbed, and light polarized in a direction perpendicular to the specific direction is transmitted, and when light is incident from the second major surface side, light polarized in the direction parallel to the specific direction is reflected, and light polarized in the direction perpendicular to the specific direction is transmitted.

The polarizing optical device may be between the second substrate and the backlight unit, or between the liquid crystal layer and the second substrate.

At least one of the above and other features and advantages of the present invention may be realized by providing a method of making a polarizing optical device having first and second major surfaces, including providing extrafine structures made of a metal and arranged in a specific direction at the first major surface, and surface treating surfaces of the extrafine metal structures, the treated surfaces being less reflective than the metal.

The surface treating may include oxidizing or forming a porous metal compound. The method may further include coloring the porous metal compound. The method may further include forming a planarizing transparent protective layer on the treated extrafine metal structure.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
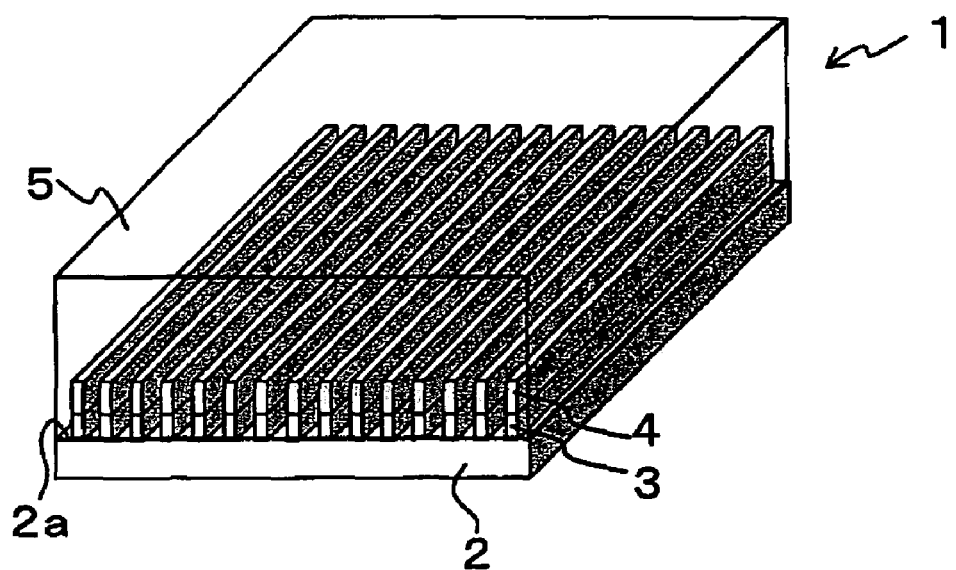
FIG. 1 illustrates a schematic perspective view of a polarizing optical device according to a first embodiment of the present invention.

Japanese Patent Application No. 2006-27668, filed on Jan. 6, 2006 in the Japanese Intellectual Property Office, and entitled: "Polarizing Optical Device and Liquid Crystal Display Using the Same," is incorporated by reference herein in its entirety.

The present invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, "extrafine" is to refer to a structure having a dimension, i.e., a width or diameter, in a direction perpendicular to a transmission direction that is less than a lower wavelength of a design wavelength range. For visible light, this dimension may be equal to or less than about 200 nm.

In accordance with embodiments of the present invention, a polarizing optical device may include an extrafine metal structure that has been surface treated to convert an upper portion of the metal structure into a more absorptive material. The surface treatment may include immersion treatment in which the metal wires are immersed in a solution, anodic oxidation, and treatment with compounds, for example, chlorophosphate, i.e., so-called chemical conversion treatment. Further, the surface treatment may include oxidation, hydroxylation, nitrization or fluorination, e.g., by plasma treatment. When the surface treatment results in a porous material, various coloration mechanisms may be employed to further increase the absorption of the upper portion.

The use of such a surface treatment may allow only a single extrafine structure to be formed, while improving anti-reflection of light incident on an upper surface of the extrafine metal structure.

First Embodiment

FIG. 1 illustrates a polarizing optical device 1 according to a first embodiment of the present invention. The polarizing optical device 1 may include a substrate 2. The substrate 2 may include an extrafine metal grid structure 3 on one major surface 2a thereof with A compound metal part 4 may be formed by surface treating an upper surface of the extrafine metal grid structure 3.

The substrate 2 may be made of, for example, optically transparent glass or resin film, e.g., polyethylene terephthalate (PET), polycarbonate (PC), polymethyl methacrylate (PMMA), etc. The extrafine metal grid structure 3 may be made of, e.g., wires having a high optical reflectance, and may have a height of about 300 nm. A wire width, a wire distance, and an average grid pitch of the extrafine metal grid structure 3 may be set to be, e.g., about 50 nm, about 100 nm, and about 150 nm, respectively.

The compound metal part 4 may be formed on outer layers of the wires. Specifically, the compound metal part 4 may be formed by surface treatment of an upper portion, e.g., an upper 150 nm, of the extrafine metal grid structure 3 having, e.g., a height of 300 nm. In other words, a different material may not be stacked on the surfaces of the extrafine metal grid structure 3, but the surfaces of the extrafine metal grid structure 3 may be modified. As a result, the total height of the extrafine metal grid structure 3 may be basically unchanged, while the compound metal part 4 on the upper surface thereof may improve anti-reflection characteristics of the polarizing optical device 1. In practice, however, the height of the extrafine grid structure 3 may be slightly altered due to the surface treatment.

For example, when the extrafine metal grid structure 3 is formed of silver wires, an upper portion of the silver wires may be oxidized, and the compound metal part 4 may be a silver oxide.

A protective layer 5 may cover the extrafine metal grid structure 3, and may be made of, e.g., a transparent photocurable resin. The protective layer 5 may have a thickness sufficient for light incident on the substrate 2 not to cause thin film interference. For visible light, the thickness may be at least approximately 1 μm or more.

The protective layer 5 may be made of, for example, a dielectric material. Thus, the protective layer 5 may serve as a protective film for preventing the damage to the surfaces of the extrafine metal grids, thereby limiting deterioration of the optical characteristics of the polarizing optical device. Also, the protective layer 5 may make an upper surface of the polarizing optical device flat, i.e., the protective layer 5 may be provided over an entire surface of the substrate on which the surface-treated extrafine metal grids are formed. Therefore, it may be easy to form electrodes or a film, e.g., an alignment film, on the upper surface of the polarizing optical device.

The protective layer 5 may be made of an adhesive, and therefore, may be used to readily attach another plate-shaped device to the polarizing optical device, e.g., using a laminating process. The transparent layer may be formed by coating resin having high transparency, strength, and applicability, e.g., an acryl-based resin.

When the protective layer 5 is used, reduction in quality of the extrafine metal grid structure 3 or damage to the extrafine metal grid structure 3 may be prevented or reduced. Therefore, the polarizing optical device 1 according to the first embodiment may have an extended useful life.

The polarizing optical device 1 according to the first embodiment may be manufactured through the following process.

First, metal, e.g., silver, may be deposited on a substrate made of glass or transparent resin film. Second, a wire pattern may be formed on the metal deposition layer, e.g., using a photoresist and a photolithographic method. Third, parts of the metal deposition layer where the photoresist pattern is not formed, i.e., where the metal is exposed, may be removed, e.g., etched. Fourth, the photoresist may be removed. Fifth, the metal wire pattern surface may be surface treated, e.g., oxidized. Sixth, the surface treated metal wire pattern surface may be coated, e.g., with an acryl-based resin coating agent.

Here, photolithography for forming the wire pattern may include using, e.g., an interference photolithographic method by holography, an electron beam lithographic method, or a direct writing method by electron beams or laser beams. In addition, a nano-imprinting method may be used. The etching of the metal may be performed using a wet type etching method using a solution, or a dry type etching method, e.g., reactive ion beam etching.

In this embodiment, material for the extrafine metal grid structure 3 only needs to be optically reflective. For example, in addition to silver discussed above, the extrafine metal grid structure 3 may be formed of, e.g., aluminum, nickel, platinum, an alloy thereof, etc.

The average grid pitch of the extrafine metal grid structure 3 may be much less than the wavelength of a visible light, e.g., between about 10 nm and 200 nm. The grid pitch may be non-uniform. For example, the extrafine metal grid structure 3 may be constructed in a dispersed structure.

The polarizing optical device 1 according to the first embodiment may be constructed as a wire structure having an average grid pitch of about 200 nm or less, and the extrafine metal grid structure 3 may be formed on the substrate 2 in a single process. The thickness of the metal layer may be controlled, e.g., using a vacuum deposition method. Consequently, the manufacture of the polarizing optical device 1 may be simplified, and the number of materials and processes may be reduced. For this reason, it may be possible to easily manufacture a large-sized polarizing optical device having a diagonal size of 20 inches or more, while reducing manufacturing costs.

Hereinafter, measurement results of the optical characteristics of the polarizing optical device 1 according to the first embodiment manufactured by the above-described method will be described.

When light having a wavelength of 532 nm was incident on the polarizing optical device 1 from the substrate 2 side, reflectance of a transverse electric (TE) wave of the incident light was about 82%, and transmittance of a transverse magnetic (TM) wave of the incident light was about 80%. When light was incident on the polarizing optical device 1 from the extrafine metal grid structure 3 side, on the other hand, reflectance of a TE wave of the incident light was about 27%, and transmittance of a TM wave of the incident light was about 80%.

Thus, when light having a wavelength of 532 nm is incident on the polarizing optical device 1, most of the TE wave incident from the substrate 2 side is reflected by the extrafine metal grid structure 3, whereas most of the TE wave incident from the extrafine metal grid structure 3 side is absorbed by the compound metal part 4. In addition, most of the TM wave of the incident light is transmitted through the polarizing optical device 1, irrespective of which side light is incident on the polarizing optical device 1.

Second Embodiment

Figure 2:
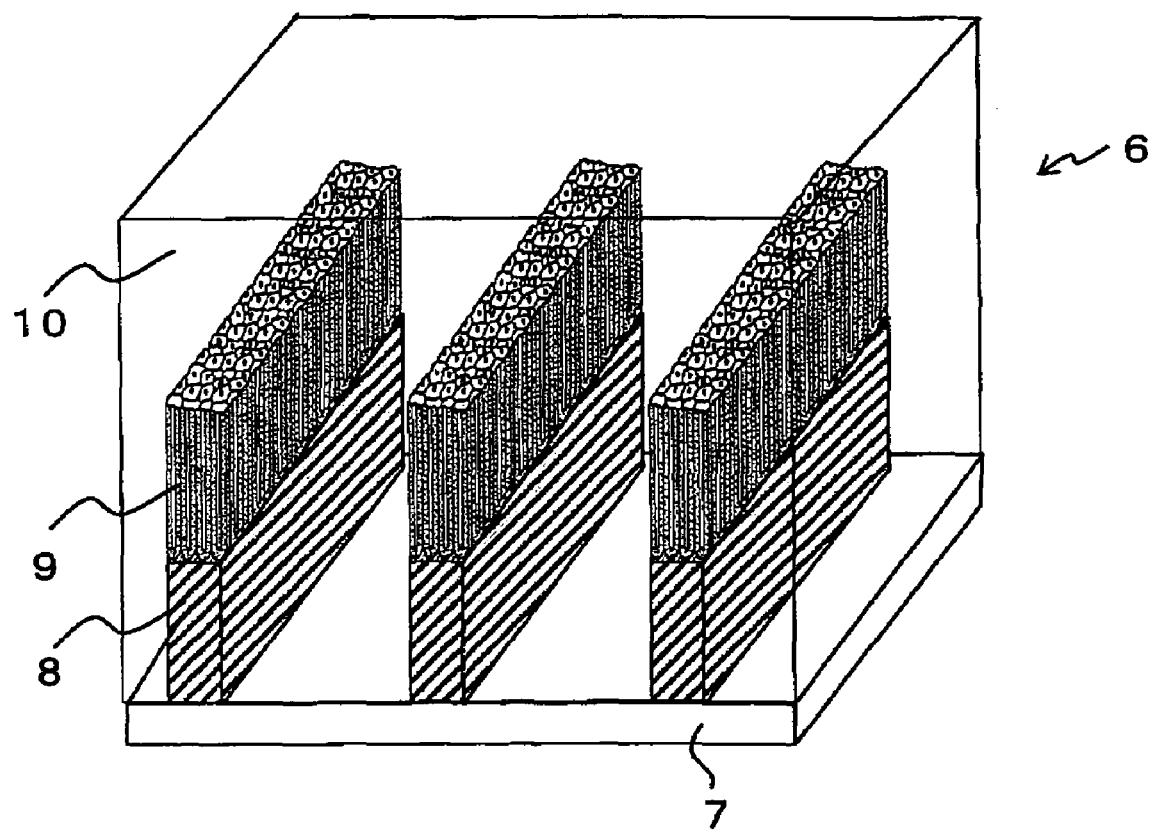
FIG. 2 illustrates a schematic perspective view of a polarizing optical device according to a second embodiment of the present invention.

FIG. 2 illustrates a polarizing optical device 6 according to a second embodiment of the present invention. The polarizing optical device 6 may include a substrate 7 and an extrafine grid structure 8 at one major surface of the substrate 7. The extrafine grid structure 8 may include a porous compound metal part 9. The porous compound metal part 9 may be colored to further enhance the anti-reflection characteristics of the polarizing optical device 6.

For example, when the extrafine grid structure 8 is aluminum, the porous compound metal part 9 may be a porous aluminum oxide film, i.e., an alumite film. The porous aluminum oxide film may be formed, e.g., by an anodic oxidation process, i.e., an alumite process.

The substrate 7 may be, e.g., optically transparent glass or resin film, such as PET, PC, or PMMA. A height, a wire width, a wire distance, and an average grid pitch of the extrafine grid structure 8 may be about, e.g., 300 nm, 50 nm, 100 nm, and 150 nm, respectively.

The porous compound metal part 9 may be formed by surface treatment of an upper portion, e.g., the upper 150 nm, of the extrafine grid structure 8. A different material is not stacked on the surfaces of the aluminum wires, but the surfaces of the aluminum wires are modified. As a result, the total height of the extrafine grid structure 8 may be basically unchanged. In practice, however, the height of the extrafine grid structure 8 may slightly increase due to the surface treatment.

The coloration of the porous compound metal part 9 may be accomplished by filling pores of the porous compound metal part 9 with a dye, e.g., urea, a pigment, e.g., carbon nano particles, electrochemically deposited dissimilar metal small particles, e.g., nano particles of nickel, silver, iron, etc., or a metal compound, e.g., aluminum hydroxide or aluminum nitride. Reflectance of TE light incident on the polarizing optical device 6 from the extrafine grid structure 8 side may be reduced by the coloration of the porous compound metal part 9.

A protective layer 10 that covers the extrafine grid structure 8 may be, e.g., a transparent photocurable resin. The protective layer 10 may have a thickness sufficient for light incident on the substrate 7 not to cause thin film interference, e.g., approximately 1 μm or more.

When the protective layer 10 is formed as described above, the reduction in quality of the extrafine grid structure 8 or the damage to the extrafine grid structure 8 may be reduced or prevented. Therefore, a polarizing optical device 6 according to the second embodiment may have an extended useful life.

The polarizing optical device 6 according to the second embodiment may be manufactured through the following process.

First, a metal, e.g., aluminum, may be deposited on a substrate, e.g., glass or transparent resin film. Second, a wire pattern may be formed on the metal deposition layer, e.g., using photoresist and a photolithographic method. Third, parts of the metal deposition layer where the photoresist pattern is not formed, i.e., where the metal is exposed, may be removed, e.g., etched. Fourth, if used, the photoresist may be removed.

Fifth, the metal wire pattern surface may be surface treated to form a porous metal compound, e.g., when the metal is aluminum, the upper surface may be oxidized by an alumite process. Sixth, the substrate with the surface treated metal wire pattern surface may be immersed in a solution containing a dye to color the porous metal compound. Seventh, the aluminum oxide layer may be coated, e.g., with an acryl-based resin coating agent.

Here, the formation of the wire pattern by the photolithographic method may be performed using an interference photolithographic method by holography, an electron beam lithographic method, or a direct writing method by electron beams or laser beams. In addition, a nano imprinting method may be used.

Also, the etching of the aluminum may be performed using a wet type etching method using, e.g., an acid solution (a solution containing phosphoric acid, nitric acid, and acetic acid mixed with each other) or an alkali solution (sodium hydroxide, potassium hydroxide, etc.), or a dry type etching method, e.g., reactive ion beam etching.

Instead of using the dye, coloration of the aluminum oxide layer may be accomplished by immersing the substrate with the oxidized aluminum wire pattern surface in a solution containing a micro pigment, e.g., carbon nano particles, such that the micro pores are filled with the carbon nano particles. As a further alternative, the aluminum oxide layer may be colored by depositing electrochemically dissimilar metal small particles (e.g, nickel nano particles) or metal oxide, e.g., aluminum hydroxide, on the aluminum oxide layer.

The average grid pitch of the extrafine grid structure 8 may be much less than the wavelength of a visible light, e.g., may be between about 10 nm and about 200 nm. It is not necessary for the grid pitch to be uniform. For example, the extrafine grid structure 8 may be a dispersed structure.

The polarizing optical device 6 according to the second embodiment may include a wire structure having an average grid pitch of 200 nm or less, and the extrafine grid structure may be formed on the substrate only once. The aluminum layer constituting the wire structure may be merely formed on the substrate, while the thickness of the aluminum layer may be controlled, e.g., using a vacuum deposition method. Consequently, the manufacture of the polarizing optical device 6 may be easier than the related art, and a reduction in the number of materials and processes may be accomplished. For this reason, it may be possible to easily manufacture a large-sized polarizing optical device having a diagonal size of 20 inches or more with the reduction in manufacturing costs.

Hereinafter, measurement results of the optical characteristics of the polarizing optical device 6 manufactured by the above-described method will be described.

When light having a wavelength of 532 nm was incident on the polarizing optical device 6 from the substrate 7 side, reflectance of a TE wave of the incident light was about 82%, and transmittance of a TM wave of the incident light was about 80%. When light was incident on the polarizing optical device 6 from the extrafine grid structure 8 side, on the other hand, reflectance of a TE wave of the incident light was about 10%, and transmittance of a TM wave of the incident light was about 80%.

Thus, when light having a wavelength of 532 nm is incident on the polarizing optical device 6, most of the TE wave incident from the substrate 7 side is reflected by the extrafine grid structure 8, whereas most of the TE wave incident from the extrafine grid structure 8 side is absorbed by the porous compound metal part 9. In addition, it can be seen that most of the TM wave of the incident light is transmitted through the polarizing optical device 6 irrespective of from which side the light is incident on the polarizing optical device 6.

Third Embodiment

Figure 3A:
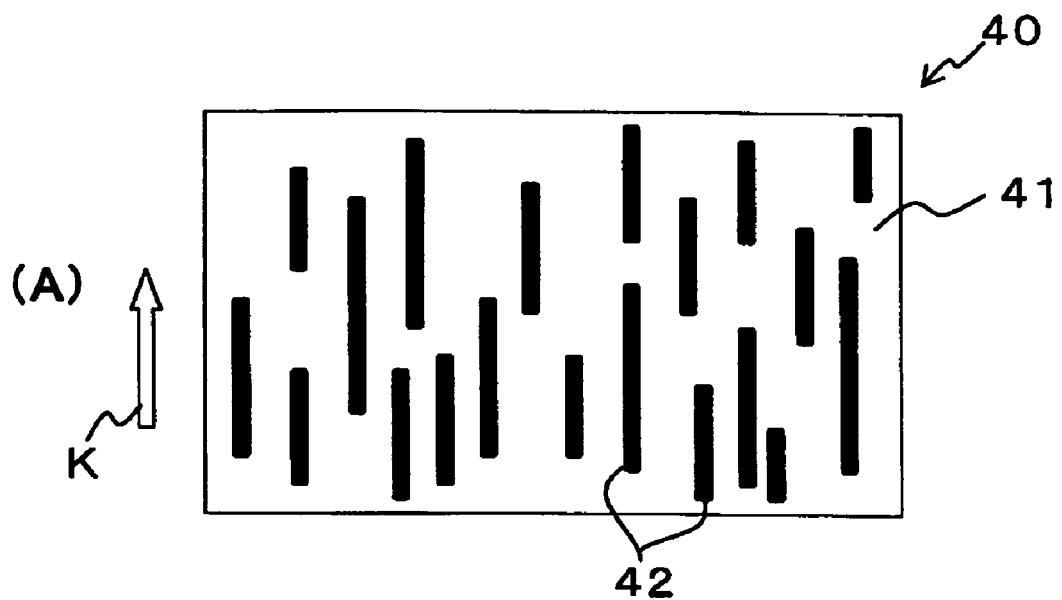
FIGS. 3a and 3b respectively illustrate a plan view and a cross-sectional view of a polarizing optical device according to a third embodiment of the present invention.
Figure 3B:
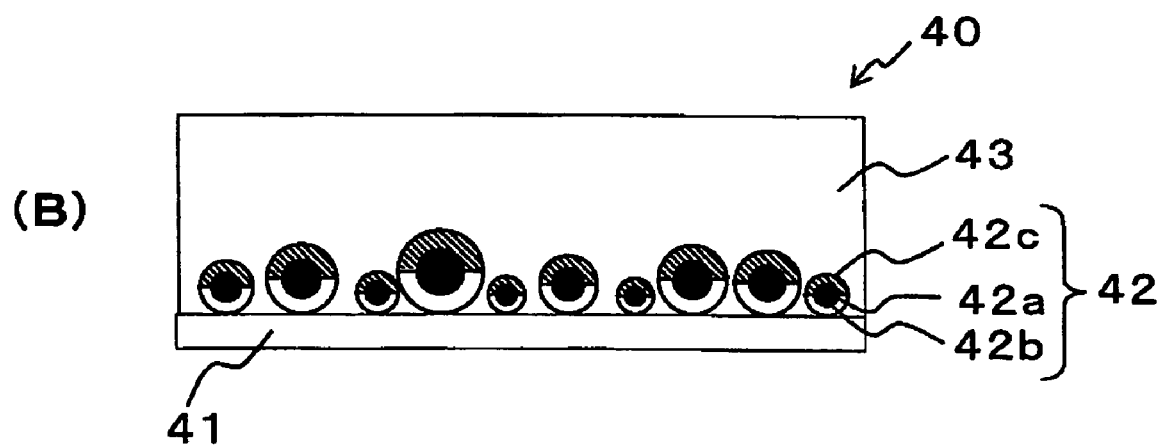

FIGS. 3*a* and 3*b* illustrate a polarizing optical device 40 according to a third embodiment of the present invention. Specifically, FIG. 3*a* illustrates a plan schematic view of the polarizing optical device 40, and FIG. 3*b* illustrates a cross-sectional view of the polarizing optical device 40.

The polarizing optical device 40 may include a plurality of unit constituents 42 disposed at one major surface of a substrate 41 in a dispersed fashion. Each unit structural member 42 may be formed by coating one half side of a carbon nano tube 42*a* with a metal 42*b*, e.g., aluminum. The carbon nano tubes 42*b* may be arranged in a predetermined direction (in a direction indicated by an arrow K in FIG. 3*a*). Also, a porous compound metal part 42*c*, e.g., an alumite film, may be formed at the other half side of each carbon nano tube 42*a*, which is exposed to the air, by, e.g., an anodic oxidation process (an alumite process). Specifically, the porous compound metal part 42*c* may be colored as described above.

The substrate 41 may be made of, e.g., optically transparent glass or a resin film, such as PET, PC, or PMMA. An average length of the carbon nano tubes 42*a* coated with the metal 42*b* in the predetermined direction (in the direction indicated by the arrow K) may be about 2 μm, and an average length, i.e., an average diameter, of the carbon nano tubes 42*a* in the direction perpendicular to the predetermined direction may be about 50 nm. The entire surface of each carbon nano tube 42*a* coated, e.g., by a molten plating method, with the metal 42*b* may have a thickness of approximately 100 nm, e.g. The arrangement of the carbon nano tubes 42*a* may be random, i.e., not regular. The distance between neighboring carbon nano tubes 42a may be between about 5 nm and 200 nm.

The porous compound metal part 42c may be formed by surface treatment of the entire metal at the upper half side of each carbon nano tube. A different material is not stacked on the surface of the aluminum coated on each carbon nano tube, but the surfaces of the metal may be modified. As a result, the total diameter of each carbon nano tube may not be changed. In practice, however, the diameter of each carbon nano tube may be slightly increased when the subjecting the metal 42b to the surface treatment to form the porous compound metal part 42c.

The coloration of the porous compound metal part 42c may be accomplished by filling pores of the porous compound metal part 42c with a dye, e.g., urea, a pigment, e.g., carbon nano particles, electrochemically deposited dissimilar metal small particles, e.g. nickel nano particles, or a metal oxide, e.g., as aluminum hydroxide. Reflectance of TE light incident on the polarizing optical device 40 from the carbon nano tubes 42a side may be reduced by the coloration of the porous compound metal part 42c.

A protective layer 43 that covers the carbon nano tubes 42a may be, e.g., a transparent photocurable resin. The protective layer 43 may have a thickness sufficient for light incident on the substrate 41 not to cause thin film interference, e.g., approximately 1 μm or more.

The protective layer 43 formed as described above may prevent or reduce reduction in quality of the carbon nano tubes 42a or damage to the carbon nano tubes 42a. Therefore, it may be possible to obtain a polarizing optical device having an extended service life.

The polarizing optical device 40 according to the third embodiment may be manufactured through the following process.

First, aluminum may be coated on the surfaces of carbon nano tubes, e.g., by a molten aluminum plating method. Second, the carbon nano tubes coated with the aluminum may be immersed in an alcohol solution in a dispersed fashion. Third, the alcohol solution containing the carbon nano tubes may be applied to a substrate.

Fourth, the carbon nano tubes may be securely fixed to the substrate by aligning the direction of the carbon nano tubes, e.g., using a magnetic force and drying the carbon nano tubes. Fifth, the aluminum coated at the sides of the carbon nano tubes where the carbon nano tubes are not securely fixed to the substrate may be oxidized, e.g., by an alumite process.

Sixth, the substrate with the carbon nano tubes securely fixed thereto may be immersed in a solution containing a dye to color an aluminum oxide layer. Seventh, the aluminum oxide layer may be coated with an acryl-based resin coating agent.

Instead of the dye, coloration may be accomplished by immersing the substrate with the carbon nano tubes securely fixed thereto in a solution containing a micro pigment such as carbon nano particles, such that the micro pores may be filled with the carbon nano particles. Alternatively, the porous compound metal part may be colored by depositing electrochemically dissimilar metal small particles, e.g., nickel nano particles, or a metal oxide, e.g., aluminum hydroxide, on the aluminum oxide layer.

The polarizing optical device 40 according to the third embodiment may have a structure in which the unit constituents have a length greater than the wavelength of a visible light in the predetermined direction (in the direction indicated by the arrow K) and have a width much less than the wavelength of the visible light in the direction perpendicular to the predetermined direction are arranged in the regular direction.

The unit constituents may be made of any material which is formed in the shape of a needle and upon which a metal can be coated, in addition to the carbon nano tubes according to this embodiment. For example, the unit constituents may be made of needle-shaped titanium oxide or needle-shaped zinc oxide. The length of each unit structural member in the predetermined direction may be greater than an upper wavelength of visible light, e.g., about 1000 nm or more, and the length of each unit structural member in the direction perpendicular to the predetermined direction may be less than a lower wavelength of visible light, e.g., between about 10 nm and 200 nm.

The polarizing optical device 40 according to the third embodiment may include unit constituents arranged in one direction. Consequently, the manufacture of the polarizing optical device 40 may be simplified, and the number of materials and processes may be reduced. For this reason, it may be possible to easily manufacture a large-sized polarizing optical device having a diagonal size of 20 inches or more, while reducing manufacturing costs.

Fourth Embodiment

Fourth embodiment of the present invention is a LCD including the polarizing optical device 6 according to the second embodiment as a lower side (backlight side) polarizing plate.

Figure 4:
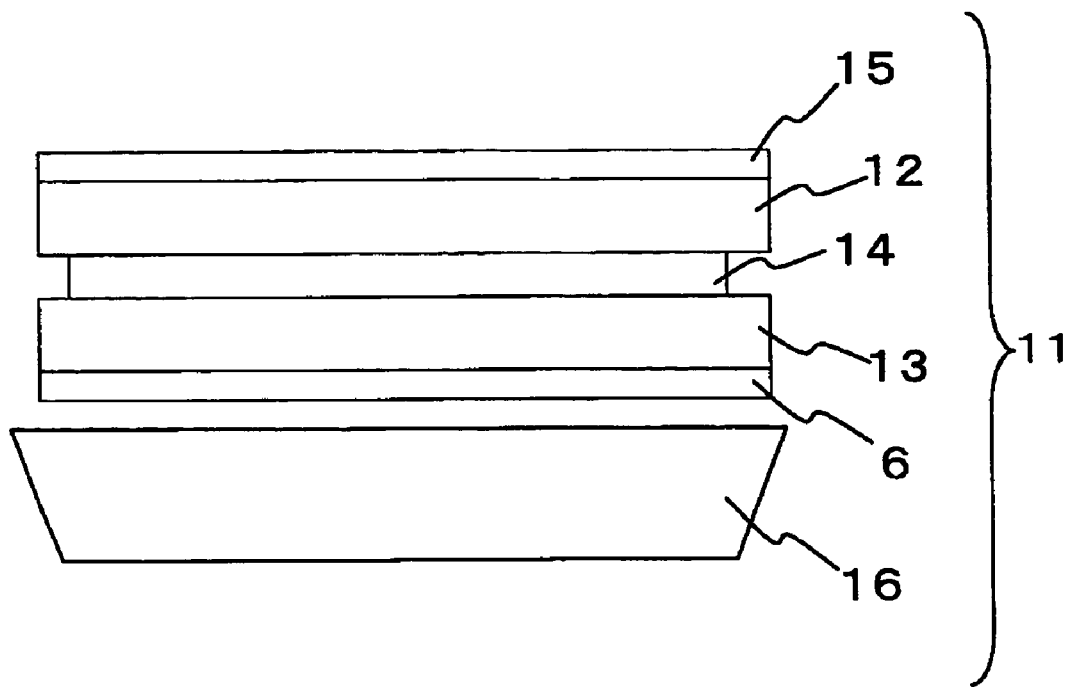
FIG. 4 illustrates a cross-sectional view of the structure of a LCD according to a fourth embodiment of the present invention.

Hereinafter, the construction of a LCD 11 using the polarizing optical device 6 according to the second embodiment will be described with reference to FIG. 4, which illustrates a sectional view of the structure of a LCD 11 according to a fourth embodiment of the present invention.

The LCD 11 may include a liquid crystal (LC) layer 14 disposed between a first substrate 12 and a second substrate 13. Transparent electrodes (not shown) for applying voltage to the liquid crystal layer 14 may be provided at LC layer side surfaces of the first and second substrates 12 and 13. More specifically, an alignment film (not shown) for orientating LC molecules constituting the LC layer may be disposed between the respective transparent electrodes and the LC layer 14. The alignment film may be rubbed in the orientation direction, and the LC molecules may be arranged in a twisted structure along the direction in which the alignment film has been rubbed.

A backlight unit (BLU) 16 may be mounted below the second substrate 13. The BLU 16 may emit light toward the second substrate 13 to illuminate the LC layer 14. The polarizing optical device 6 according to the second embodiment may be attached to the backlight side surface of the second substrate 13 via a protective layer 10 serving as a bonding agent.

An absorption polarizing plate 15 may be mounted at the upper side surface, i.e., the observer side surface, of the first substrate 12. The absorption polarizing plate 15 may be positioned such that the transmission axis of the absorption polarizing plate 15 is perpendicular to the transmission axis of the polarizing optical device 6.

Figure 5A:
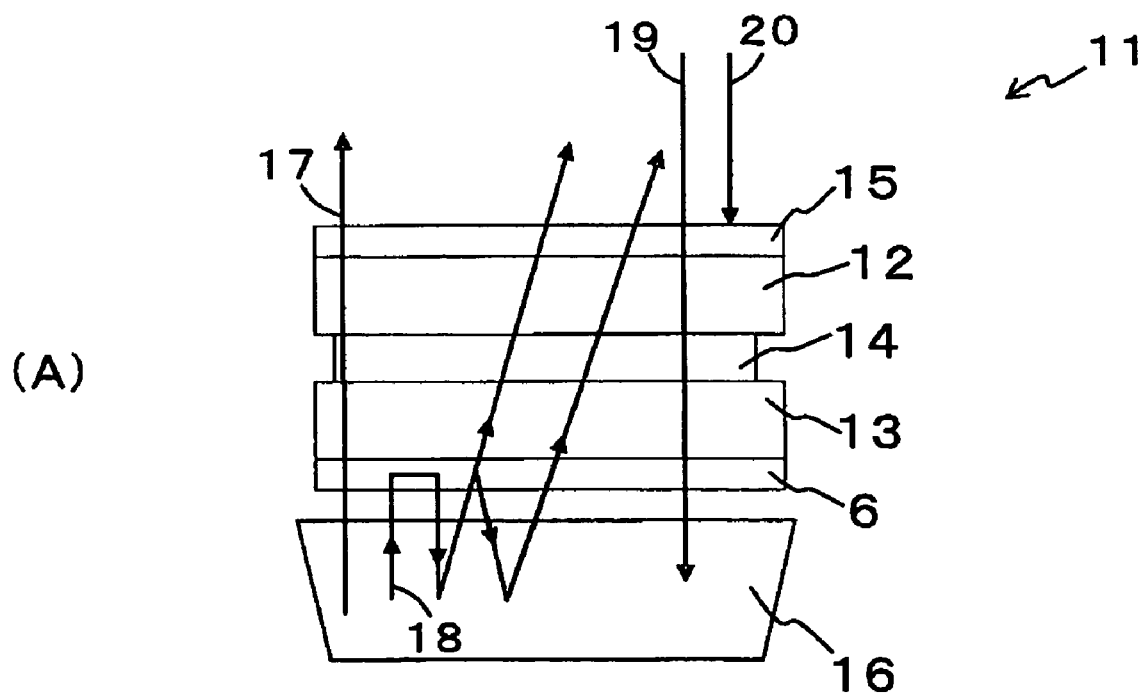
FIGS. 5a and 5b illustrate cross-sectional views of operation of the LCD according to the fourth embodiment of the present invention.
Figure 5B:
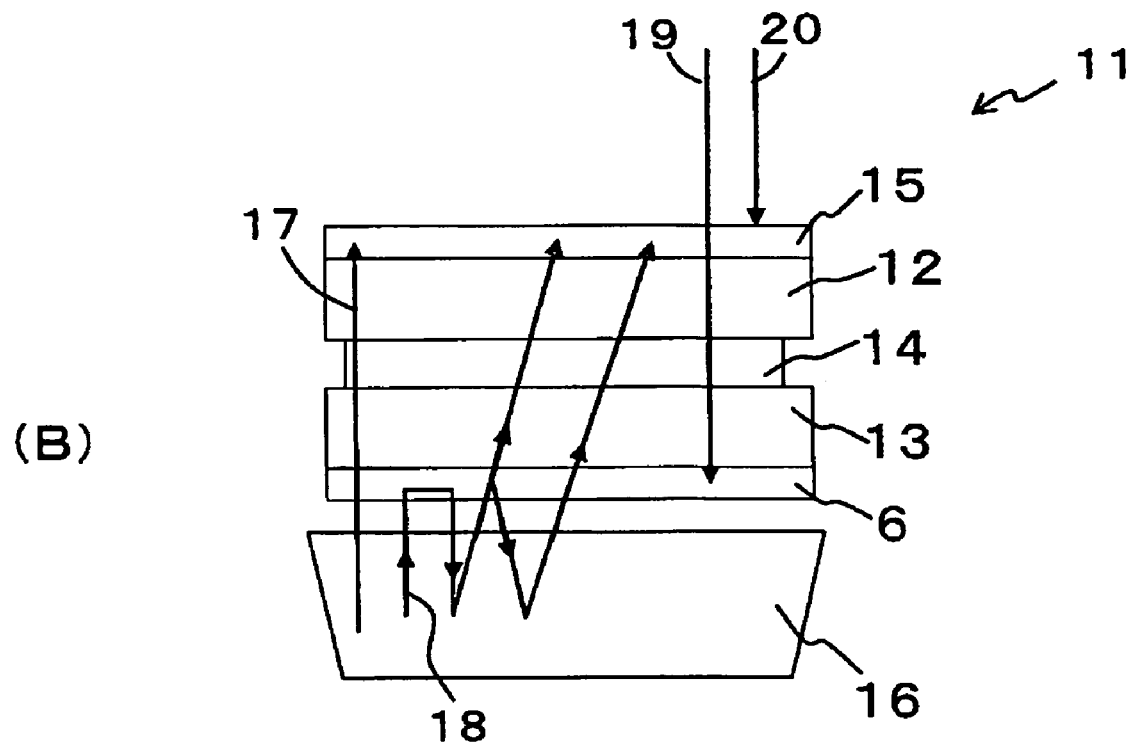

Hereinafter, the display principle of the LCD 11 shown in FIG. 4 will be described. FIGS. 5a and 5b illustrate cross-sectional views of the principle of the LCD 11 in which a bright state is realized when an electric field is not applied to the LC layer 14 and a dark state is realized when an electric field is applied to the LC layer 14, respectively.

First, the principle of the LCD 11 in which a bright state is realized when an electric field is not applied to the LC layer 14 will be described with reference to FIG. 5a.

Light including all polarized light components may be incident on the LCD 11 toward the LC layer 14 from the BLU 16. When polarized light components from the BLU 16, e.g., a TM polarized light 17, coincides with the transmission axis of the polarizing optical device 6, TM polarized light 17 may be transmitted through the polarizing optical device 6, and may then be rotated by 90 degrees at the LC layer 14. Subsequently, the TM polarized light 17 may be transmitted through the absorption polarizing plate 15 at the observer side. As a result, the TM polarized light 17 may exit the observer side, whereby a bright state may be obtained.

Among the polarized light components from the BLU 16, a TE polarized light 18 may be repeatedly reflected by scattering reflection layers disposed in the polarizing optical device 6 and the BLU 16. During the reflection of the TE polarized light 18, the polarizing direction component of the TE polarized light 18 may be scattered. As a result, the TE polarized light 18 may be changed into a non-polarized state, and then may be recycled.

On the other hand, ambient light, including polarized light components that are not related to displaying, may also be incident on the LCD 11 from the outside. Among the polarized light components from the outside, when polarized light 19 coincides with the transmission axis of the absorption polarizing plate 15, the polarized light 19 may be transmitted through the absorption polarizing plate 15, and may then be rotated by 90 degrees at the LC layer 14. Subsequently, the polarized light 19 may be transmitted through the polarizing optical device 6 at the second plate 13 side, and may then be diffusely reflected by the scattering reflection layer in the BLU 16. During the reflection of the polarized light 19, the polarized light 19 may be changed into a non-polarized state, and may then be used for display.

Among the polarized light components from the outside, a polarized light 20, which is perpendicular to the polarized light 19, may be absorbed by the absorption polarizing plate 15. Therefore, the polarized light 20 does not contribute to display.

Next, the principle of the LCD 11 in which a dark state is realized when an electric field is applied to the LC crystal layer 14 will be described with reference to FIG. 5b.

Among all polarized light components incident on LCD 11 from the BLU 16, the TM polarized light 17, which coincides with the transmission axis of the polarizing optical device 6, may be transmitted through the polarizing optical device 6. However, the polarized state of the incident light is maintained at the LC layer 14 when an electric field is applied to the LC layer 14, i.e., the polarization of the TM polarized light 19 is not rotated by the LC layer 14. Consequently, the TM polarized light 17 may be absorbed by the absorption polarizing plate 15 at the observer side. As a result, a dark state may be obtained. Among the polarized light components from the BLU 16, the TE polarized light 18, which is perpendicular to the TM polarized light 17, may be reflected by the polarizing optical device 6. As a result, a dark state is obtained.

When ambient light, including polarized light components that are not related to display, is incident on the LCD 11, the polarized light 19, which coincides with the transmission axis of the absorption polarizing plate 15 at the first substrate 12 side, may be transmitted through the absorption polarizing plate 15 and the LC layer 14, and may then be absorbed into the polarizing optical device 6 at the second plate 13 side. As a result, the polarized light 19 does not return to the observer side, and, therefore, high contrast may be maintained. Also, the polarized light 20, which is perpendicular to the polarized light 19, may be absorbed by the absorption polarizing plate 15. Therefore, high contrast may be maintained.

When the polarizing optical device 6 according to the second embodiment is used as the lower side polarizing plate as described above, the display contrast may be maintained. In addition, the light emitted from the BLU 16 may be generally changed into light having a single polarization direction, and may then be effectively used. Consequently, it is possible to obtain a display having high brightness and high contrast.

In this embodiment, the LCD may be constructed by attaching the polarizing optical device 6 according to the second embodiment to the second substrate 13 of the LCD. However, the LCD according to the present invention is not limited to this structure. For example, the protective layer 10 of the polarizing optical device 6 may have no adhesiveness, and the polarizing optical device 6 may be disposed between the second substrate 13 and the BLU 16 of a conventional LCD. In this case, the display contrast may be further increased. Consequently, it may be also possible to dispose the conventional dichroic polarizing optical device between the polarizing optical device 6 according to the present invention and the second substrate 13.

Fifth Embodiment

Fifth embodiment of the present invention is a LCD including the polarizing optical device according to a variation on the second embodiment, the substrate of which is used may also serve as a lower side (backlight side) substrate constituting a LC panel and may serve as a lower side (backlight side) polarizing plate.

Figure 6:
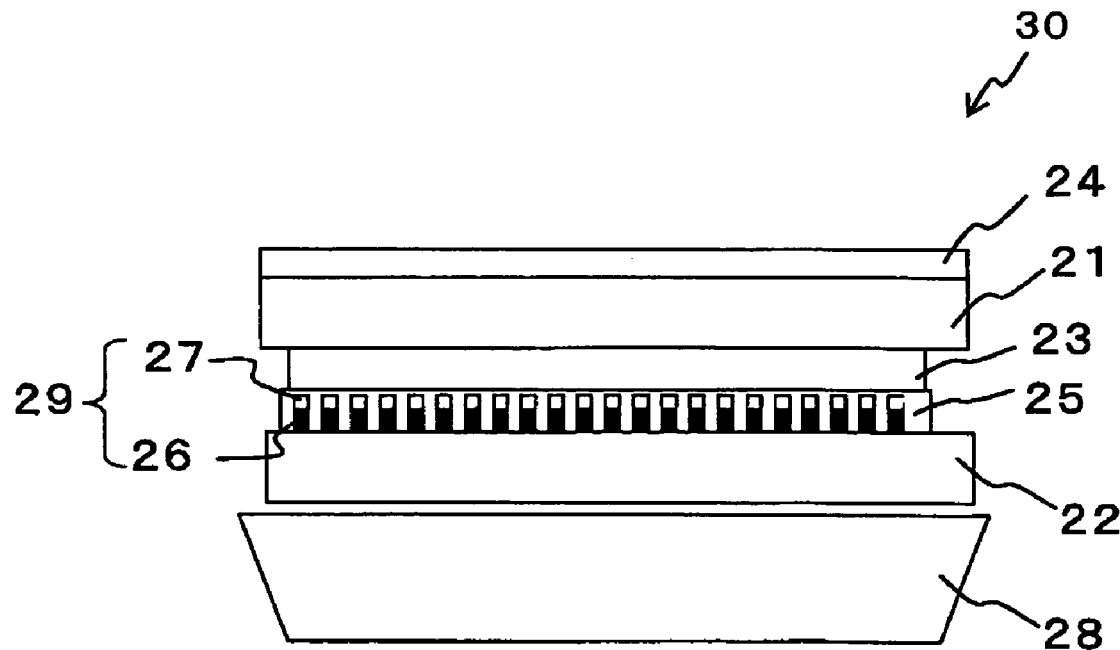
FIG. 6 illustrates a cross-sectional view of a LCD according to a fifth embodiment of the present invention.

Hereinafter, the construction of a LCD 30 will be described with reference to FIG. 6, which illustrates a sectional view of the structure of a LCD 30 according to a fifth embodiment of the present invention.

The LCD 30 may include a LC layer 23 disposed between a first substrate 21 and a second substrate 22. An extrafine metal grid structure 26 may be formed at a LC layer 23 side surface of the second substrate 22. A metal compound part 27 may be formed, e.g., by surface treatment, at the surface of the extrafine metal grid structure 26. Specifically, the metal compound part 27 may be colored at the surface of the extrafine metal grid structure 26. Also, transparent resin may be applied to the entire upper surface of the second substrate 22 as a protective layer 25 for covering the extrafine metal grid structure 26.

Transparent electrodes (not shown) for applying voltage to the LC crystal layer 23 may be provided at the LC layer 23 side surface of the first substrate 21 and the LC crystal layer 23 side surface of the protective layer 25. More specifically, an alignment film (not shown) for orientating LC molecules may be disposed between the respective transparent electrodes and the LC layer 23. The alignment film may be rubbed in the orientation direction, and the LC molecules may be arranged in a twisted structure along the direction in which the alignment film is rubbed.

A BLU 28 may be mounted below the second substrate 22. The BLU 28 may emit light toward the second substrate 22 to illuminate the LC layer 23.

An absorption polarizing plate 24 may be mounted at the upper side surface, i.e., the observer side surface, of the first substrate 24. The absorption polarizing plate 24 may be attached to the first substrate 21 such that the transmission axis of the absorption polarizing plate 24 is perpendicular to the transmission axis of a polarizing optical device 29 attached to the second substrate 22.

Figure 7A:
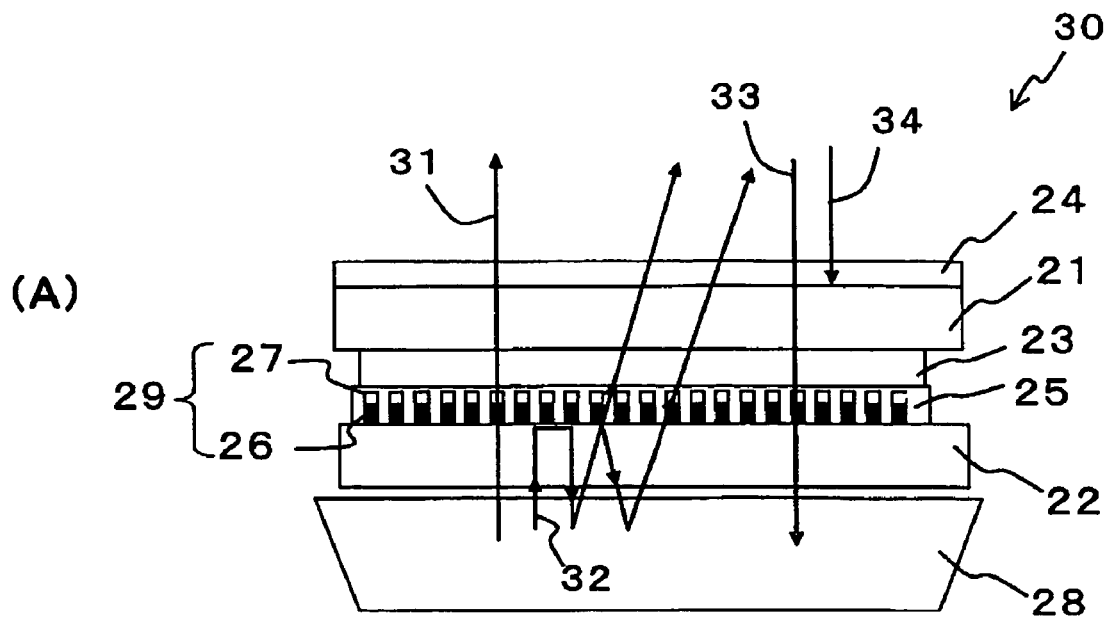
FIGS. 7a and 7b illustrate cross-sectional views of operation of the LCD according to the fifth embodiment of the present invention.
Figure 7B:
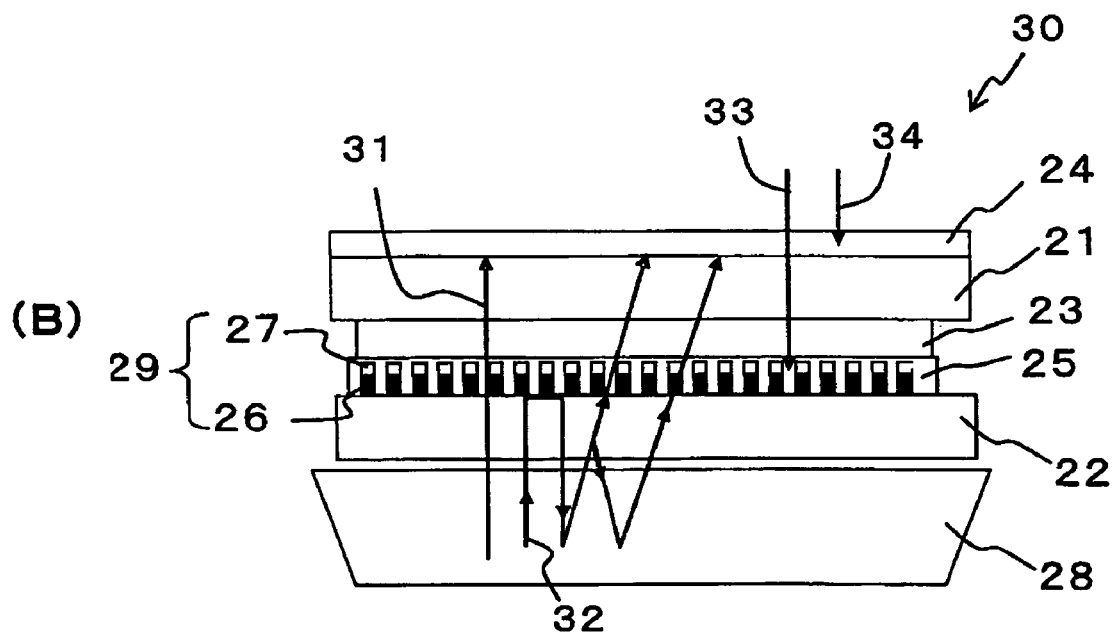

Hereinafter, the display principle of the LCD 30 shown in FIG. 6 will be described. FIGS. 7a and 7b illustrate cross-sectional views of the principle of the LCD 30 in which a bright state is realized when an electric field is not applied to the LC layer 23 and a dark state is realized when an electric field is applied to the LC layer 23, respectively.

First, the principle of the LCD 30 in which a bright state is realized when an electric field is not applied to the LC layer 23 will be described with reference to FIG. 7a.

Light including all polarized light components may be incident on the LCD 30 toward the LC layer 23 from the BLU 28. When a polarized light component from the BLU 28, e.g., a TM polarized light 31, coincides with the transmission axis of the polarizing optical device 29 at the second plate 22 side, this polarized light is transmitted through the polarizing optical device 29, and is then rotated by 90 degrees at the LC layer 23. Subsequently, the TM polarized light 31 may be transmitted through the absorption polarizing plate 24 at the observer side. As a result, the TM polarized light 31 exits to the observer side, whereby a bright state is obtained.

Among the polarized light components from the BLU 28, a TE polarized light 32 may be repeatedly reflected by scattering reflection layers disposed in the polarizing optical device 29 and the BLU 28. During the reflection of the TE polarized light 32, the polarizing direction component of the TE polarized light 32 may be scattered. As a result, the TE polarized light 32 may be changed into a non-polarized state, and the light may be recycled.

When ambient light including polarized light components, which are not related to the display, is incident on the LCD 30, on the other hand, a polarized light 33, which coincides with the transmission axis of the absorption polarizing plate 24 at the first substrate 21 side, may be transmitted through the absorption polarizing plate 24, and may then be rotated by 90 degrees at the LC layer 23. Subsequently, the polarized light 33 is transmitted through the polarizing optical device 29 at the second plate 22 side, and may then be reflected by the scattering reflection layer in the BLU 28. During reflection of the polarized light 33, the polarized light 33 may be changed into a non-polarized state, and may then be used for display.

Among the polarized light components from the outside, a polarized light 34, which is perpendicular to the polarized light 33, may be absorbed by the absorption polarizing plate 24. Therefore, the polarized light 34 does not contribute to the display.

Next, the principle of the LCD 30 in which a dark state is realized when an electric field is applied to the LC layer 23 will be described with reference to FIG. 7b.

Among all polarized light components incident on LCD 30 from the BLU 28, the TM polarized light 31 is transmitted through the polarizing optical device 29. However, the polarization state of the incident light is maintained at the LC layer 23 when an electric field is applied to the LC layer 23. Consequently, the TM polarized light 31 may be absorbed by the absorption polarizing plate 24 at the observer side. As a result, a dark state is obtained. Among the polarized light components from the BLU 28, the TE polarized light 32, which is perpendicular to the TM polarized light 31, is reflected by the polarizing optical device 29. As a result, a dark state is obtained.

When ambient light including polarized light components, which are not related to the display, is incident on the LCD 30, on the other hand, the polarized light 33, which coincides with the transmission axis of the absorption polarizing plate 24, is transmitted through the absorption polarizing plate 24 and the LC layer 23, and is then absorbed by the polarizing optical device 29 at the second plate 22 side. As a result, the polarized light 33 does not return to the observer side, and therefore, high contrast may be maintained. Also, the polarized light 34, which is perpendicular to the polarized light 33, may be absorbed into the absorption polarizing plate 24, and therefore, high contrast may be maintained.

As described above, the display contrast may be maintained in the LCD according to the present invention. In addition, light emitted from the BLU 28 may be generally changed into a one polarized-direction light, and is then effectively used. Consequently, it may be possible to obtain a display having high brightness and high contrast.

In the fourth and fifth embodiments, the polarizing optical device 6 according to the second embodiment may be used. However, it is also possible to construct the LCD using the polarizing optical device 1 according to the first embodiment or the polarizing optical device 40 according to the third embodiment.

As apparent from the above description, embodiments of the present invention may provide a polarized optical device that may be constructed in a large-sized structure and may have a high optical efficiency. Further, when a protective layer is provided on the extrafine metal structure and provides a planar upper surface thereof, the polarized optical device may more readily be integrated with other components, e.g., with electrodes, other substrates, films, etc. In addition, when the polarized optical device according to the present invention is applied to a LCD, it may be possible to provide a LCD that is capable of realizing a display having high contrast, can be constructed in a large-sized structure, and has high optical efficiency.

The polarized optical device according to embodiments of the present invention may be used as a polarizing plate of a transmission type, semi-transmission type, or projection type LCD.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A polarizing optical device having first and second major surfaces, comprising:
   extrafine structures made of a metal and arranged in a specific direction at the first major surface; and
   a metal compound part formed on surfaces of the extrafine metal structures, wherein:
   each extrafine metal structure has a length in the specific direction that is longer than a maximum design wavelength and a length in a direction perpendicular to the specific direction that is less than a minimum design wavelength,
   when light is incident from the first major surface side, light polarized in a direction parallel to the specific direction is absorbed, and light polarized in a direction perpendicular to the specific direction is transmitted, and
   when light is incident from the second major surface side, light polarized in the direction parallel to the specific direction is reflected, and light polarized in the direction perpendicular to the specific direction is transmitted.

2. The polarizing optical device as claimed in claim 1, wherein the extrafine metal structures includes a plurality of unit constituents arranged in the specific direction.

3. The polarizing optical device as claimed in claim 2, wherein the plurality of unit constituents are dispersed.

4. The polarizing optical device as claimed in claim 2, wherein the plurality of unit constituents are arranged in a regular pattern.

5. The polarizing optical device as claimed in claim 4, wherein the plurality of unit constituents each extend substantially in the specific direction on the first major surface.

6. The polarizing optical device as claimed in claim 1, further comprising a transparent layer covering the extrafine metal structure.

7. The polarizing optical device as claimed in claim 6, wherein an upper surface of the transparent layer is approximately flat.

8. The polarizing optical device as claimed in claim 6, wherein the transparent layer is made of an adhesive transparent resin.

9. The polarizing optical device as claimed in claim 6, wherein the transparent layer has a thickness sufficient not to cause thin film interference.

10. The polarizing optical device as claimed in claim 1, wherein the metal is aluminum and the metal compound is an anodic oxide film.

11. The polarizing optical device as claimed in claim 1, wherein the metal compound part includes a colorant.

12. The polarizing optical device as claimed in claim 11, wherein the colorant includes at least one of a dye, a pigment, dissimilar small metal particles and metal compound particles.

13. The polarizing optical device as claimed in claim 1, wherein the extrafine metal structures include a tube coated with a metal, the metal compound part being formed on an upper surface of the tube.

14. A liquid crystal display including a liquid crystal panel having a liquid crystal layer disposed between a first substrate and a second substrate, and a backlight unit for illuminating the liquid crystal layer from the second substrate side, the liquid crystal display comprising:
 a polarizing optical device between the first substrate and the backlight unit, the polarizing optical device including:
 extrafine structures made of a metal and arranged in a specific direction at the first major surface; and
 a metal compound part formed on surfaces of the extrafine metal structures, the first major surface of the polarizing optical device facing the liquid crystal layer, wherein:
 each extrafine metal structure has a length in the specific direction that is longer than a maximum design wavelength and a length in a direction perpendicular to the specific direction that is less than a minimum design wavelength,
 when light is incident from the first major surface side, light polarized in a direction parallel to the specific direction is absorbed, and light polarized in a direction perpendicular to the specific direction is transmitted, and
 when light is incident from the second major surface side, light polarized in the direction parallel to the specific direction is reflected, and light polarized in the direction perpendicular to the specific direction is transmitted.

15. The liquid crystal display as claimed in claim 14, wherein the polarizing optical device is between the second substrate and the backlight unit.

16. The liquid crystal display as claimed in claim 14, wherein the polarizing optical device is between the liquid crystal layer and the second substrate.

17. A method of making a polarizing optical device having first and second major surfaces, comprising:
 providing extrafine structures made of a metal and arranged in a specific direction at the first major surface; and
 surface treating surfaces of the extrafine metal structures to form a metal compound part, the metal compound part being less reflective than the metal, wherein:
 each extrafine metal structure has a length in the specific direction that is longer than a maximum design wavelength and a length in a direction perpendicular to the specific direction that is less than a minimum design wavelength, and the extrafine structures are arranged such that:
 when light is incident on the first major surface, light polarized in a direction parallel to the specific direction is absorbed, and light polarized in a direction perpendicular to the specific direction is transmitted, and
 when light is incident from on second major surface, light polarized in the direction parallel to the specific direction is reflected, and light polarized in the direction perpendicular to the specific direction is transmitted.

18. The method as claimed in claim 17, wherein surface treating includes oxidizing.

19. The method as claimed in claim 17, wherein surface treating includes forming a porous metal compound.

20. The method as claimed in claim 19, further comprising coloring the porous metal compound.

21. The method as claimed in claim 17, wherein the metal is aluminum and surface treating includes and alumite process.

22. The method as claimed in claim 17, further comprising forming a planarizing transparent protective layer on the treated extrafine metal structure.

23. A polarizing optical device having first and second major surfaces, comprising:
 extrafine structures made of a metal and arranged in a specific direction at the first major surface; and
 a metal compound part formed on surfaces of the extrafine metal structures, wherein:
 when light is incident from the first major surface side, light polarized in a direction parallel to the specific direction is absorbed, and light polarized in a direction perpendicular to the specific direction is transmitted,
 when light is incident from the second major surface side, light polarized in the direction parallel to the specific direction is reflected, and light polarized in the direction perpendicular to the specific direction is transmitted, and
 the metal compound part on the surfaces of the extrafine metal structures is an oxide of metal in the extrafine metal structures.

24. A polarizing optical device having first and second major surfaces, comprising:
 extrafine structures made of a metal and arranged in a specific direction at the first major surface; and
 a metal compound part formed on surfaces of the extrafine metal structures, wherein:
 each extrafine metal structure has a length in the specific direction that is longer than a maximum design wavelength and a length in a direction perpendicular to the specific direction that is less than a minimum design wavelength.

25. The polarizing optical device as claimed in claim 24, wherein the metal compound part on the surfaces of the extrafine metal structures is an oxide of metal in the extrafine metal structures.

26. The polarizing optical device as claimed in claim 25, wherein the metal is aluminum and the metal compound is an anodic oxide film.

27. The polarizing optical device as claimed in claim 24, wherein the extrafine metal structures include a tube coated with a metal, the metal compound part being formed on an upper surface of the tube.

* * * * *